United States Patent
Robinson et al.

(10) Patent No.: US 12,145,081 B1
(45) Date of Patent: Nov. 19, 2024

(54) FLUID FLOW CONTROL DEVICE WITH DIFFERENT PERMEABILITIES

(71) Applicant: National Technology & Engineering Solutions of Sandia, LLC, Albuquerque, NM (US)

(72) Inventors: David Bruce Robinson, Hayward, CA (US); Maher Salloum, Livermore, CA (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 849 days.

(21) Appl. No.: 17/158,115

(22) Filed: Jan. 26, 2021

(51) Int. Cl.
*B01D 15/22* (2006.01)
*B01D 35/157* (2006.01)
*B33Y 10/00* (2015.01)
*B33Y 70/00* (2020.01)
*B33Y 80/00* (2015.01)

(52) U.S. Cl.
CPC .......... *B01D 15/22* (2013.01); *B01D 35/157* (2013.01); *B33Y 10/00* (2014.12); *B33Y 70/00* (2014.12); *B33Y 80/00* (2014.12)

(58) Field of Classification Search
CPC ...... B01D 15/22; B01D 35/157; B33Y 10/00; B33Y 70/00; B33Y 80/00
See application file for complete search history.

(56) References Cited

U.S. PATENT DOCUMENTS

| | | |
|---|---|---|
| 8,397,586 B2 | 3/2013 | Sorenson et al. |
| 8,728,387 B2 | 5/2014 | Jones et al. |
| 2017/0239726 A1 | 8/2017 | Palumbo et al. |
| 2019/0054534 A1 | 2/2019 | Norton et al. |

FOREIGN PATENT DOCUMENTS

CN  106937827 A  *  7/2017  .......... A47J 31/0615

* cited by examiner

*Primary Examiner* — Waqaas Ali
(74) *Attorney, Agent, or Firm* — Calfee, Halter & Griswold LLP; Samantha Updegraff

(57) ABSTRACT

A fluid flow control device comprising an insert body having a first portion with a first permeability and second portion with a second permeability that is different from the first permeability. The insert body can be shaped for sealing insertion into a fluid flow structure for fluid flow therethrough. The first portion and the second portion can be arranged in the insert body to cause uniform fluid flow velocity of fluid in the fluid flow structure at an exit of the insert body when the fluid passes through the first portion and the second portion when the insert body is placed inside the fluid flow structure.

18 Claims, 7 Drawing Sheets

FLUID FLOW CONTROL DEVICE WITH DIFFERENT PERMEABILITIES

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

During chemical engineering processes, it is often necessary to distribute fluid from a relatively narrow tube with a broader cross-section, to an array of tubes, or into a porous medium for catalyzed reactive flow, fluid purification, chromatographic separation, or the like. Typical columns used for this purpose have narrow inlets and outlets and wider porous regions to compensate for flow resistance caused by backpressure generated as the fluid flows through the porous region. Ideally, the flow rate through the porous region is uniform to maximize contact between the fluid and the porous region and uniformity of composition among fluid elements at the outlet. However, fluid components going from the narrow region to the wider region or from the wider region to the narrow region will spread or contract non-uniformly. This non-uniform distribution results in non-uniform flow through the porous region. Conventionally, to overcome the non-uniform distribution, a frit with coarse pores is used to distribute or collect flow laterally as a transition to the active porous region.

SUMMARY

The following is a brief summary of subject matter that is described in greater detail herein. This summary is not intended to be limiting as to the scope of the claims.

In an exemplary embodiment, described herein is a fluid flow control device with regions having different permeability to control fluid flow velocities therethrough. The fluid flow control device comprises an insert body having a first portion with a first permeability and second portion with a second permeability that is different from the first permeability. The insert body can be shaped for sealing insertion into a fluid flow structure for fluid flow therethrough. The first portion and the second portion can be arranged in the insert body to cause uniform fluid flow velocity of fluid in the fluid flow structure at an exit of the insert body when the fluid passes through the first portion and the second portion when the insert body is placed inside the fluid flow structure.

A method of forming a fluid flow control device with graded permeability includes a step of determining an arrangement for a first portion and a second portion in an insert body to cause uniform fluid flow velocity of fluid in a fluid flow structure at an exit of the insert body when the fluid passes through the first portion and the second portion when the insert body is placed inside the fluid flow structure. The first portion can have a first permeability and the second portion can have a second permeability that is different from the first permeability. The method can further include forming the insert body including the first portions and the second portion. The insert body can be formed for sealing insertion into the fluid flow structure.

Further, in accordance with various aspects, provided is a fluid flow control device with graded permeability comprising an insert body with a first portion with a first permeability and a second portion with a higher second permeability. The first portion and the second portion can be arranged in the insert body to cause uniform fluid flow velocity of fluid in the fluid flow structure at an exit of the insert body when the fluid passes through the first portion and the second portion when the insert body is placed inside the fluid flow structure. The insert body can have a circular cross-section and the first portion and the second portion can be arranged concentrically.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
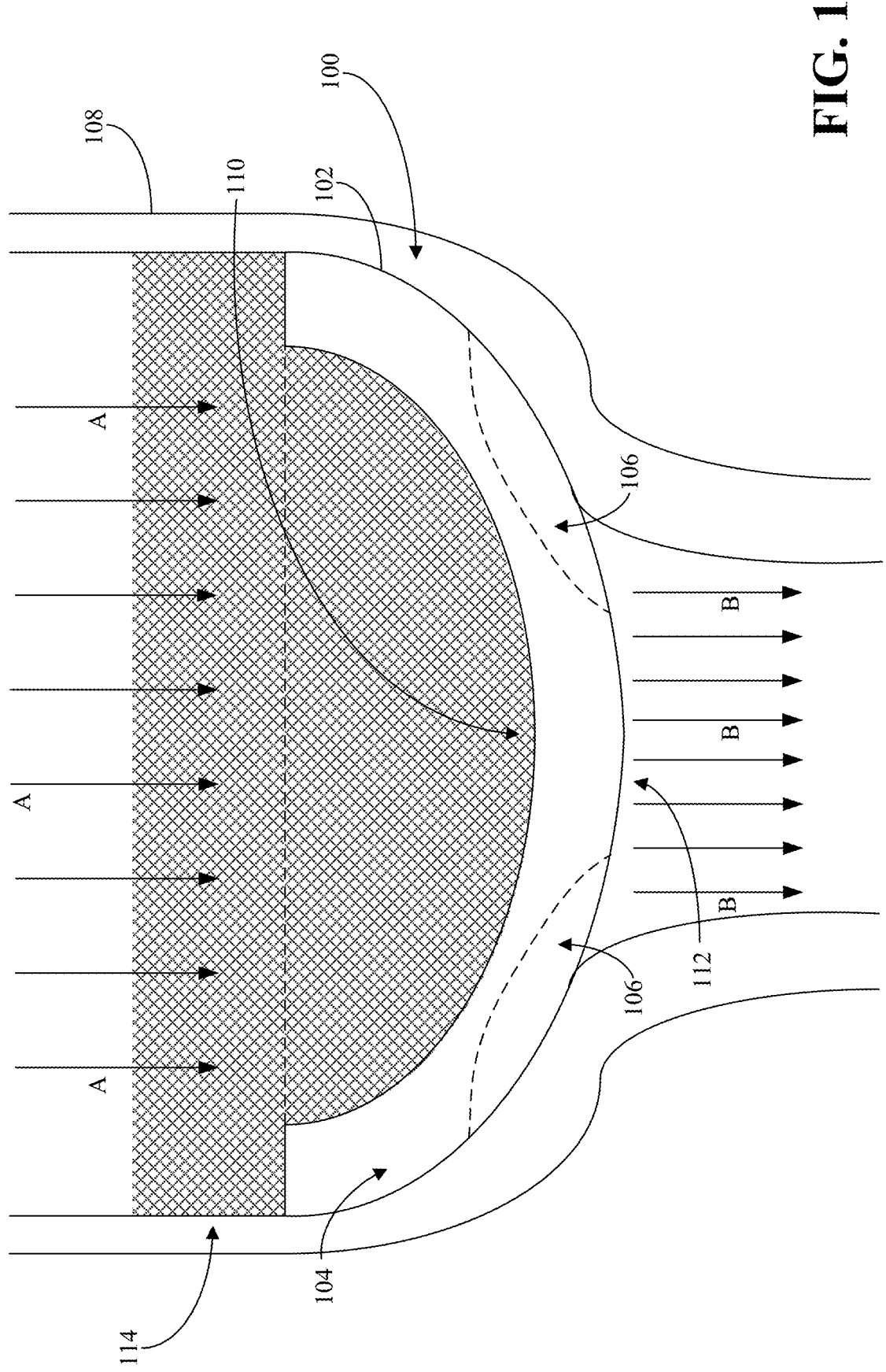
FIG. 1 illustrates an exemplary fluid flow control device with graded permeability.

Various technologies pertaining to a fluid flow control device with graded permeability are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an apparatus for modifying fluid flow velocity in a fluid flow structure. More particularly, the apparatus can include varying permeabilities to cause different fluid velocities for different portions of the apparatus. The different portions can align with different calculated flow streamlines in the fluid flow structure. A calculated velocity of fluid flow along a particular streamline can be used to calculate permeability for a portion that lines up with the streamline based on a desired fluid flow velocity.

Turning to FIG. 1, illustrated is a cross-sectional view of an exemplary embodiment of a fluid flow control device with graded permeability that can be inserted into a tube. As illustrated in FIG. 1, the fluid flow control device comprises a porous insert 100 with a plurality of portions formed therein with varying permeabilities, wherein the porous insert 100 is placed within a fluid flow structure 108, such as a tube through which fluid flows. The varying permeabilities can be arranged within the porous insert 100 to tailor fluid flow velocity through the porous insert 100. More particularly, the porous insert 100 can be placed inside the fluid flow structure 108 (e.g., a pipe) to customize velocity of fluid flowing in the fluid flow structure at an exit of the insert 100, as will be described in detail below.

Fluid can travel along one or more flow streamlines in the fluid flow structure 108. The fluid can travel at different velocities in each of these flow streamlines, e.g., a first velocity along a first streamline and a second, slower velocity along a second streamline. The velocity of fluid along any particular streamline may depend on shape of the fluid flow structure, type of fluid, and/or the like. The porous insert 100 can be designed to leverage the arrangement of varying permeabilities to modify velocities along these flow streamlines.

In certain applications, it may be desirable to have a particular velocity at a particular point along a flow streamline. For instance, it may be desirable to have uniform velocity for all of the flow streamlines at an outlet of the fluid flow structure to prevent backflow and improve control of outflow from the outlet. In another application, it may be desirable to have uniform expansion of fluid as the fluid in the fluid flow structure travels from a narrow section to a wider section in the fluid flow structure. This uniform expansion can be achieved by controlling velocities along one or more flow streamlines adjacent an expansion point in the fluid flow structure. In other applications, a particular velocity along a particular flow streamline may be desired.

The porous insert 100 can be designed such that a particular permeability can align with a particular flow streamline when the insert 100 is placed in the fluid flow structure. For instance, a first portion with a first permeability can be aligned with a first flow streamline and a second portion with a second permeability can be aligned with a second flow streamline, as will be described in detail below. The first permeability can be lower than the second permeability such that velocity of fluid flowing through the first portion is lower than velocity of fluid flowing through the second portion. Where uniform fluid velocity for fluid exiting the porous insert is desired, the first portion can be aligned with faster flow streamline while the second portion can be aligned with a slower flow streamline. The porous insert 100 can include any suitable number of permeabilities arranged in any suitable pattern to create a specific velocity profile at an exit of the insert 100.

The porous insert 100 can have any suitable shape and/or size for modifying fluid flow velocity for the fluid flow structure. For instance, in one embodiment, the porous insert 100 may have a circular cross-section. In another embodiment, the porous insert 100 can have a cross-section that is triangular, square, rectangular, ovular, and/or the like. Moreover, in an embodiment, the porous insert 100 can have a curved profile. In another embodiment, the porous insert 100 can have a profile that is planar, undulating, angled, and/or the like. The shape and/or size of the porous insert 100 may depend on the fluid flow structure, the fluid, the permeability(s), the velocity profile at the exit of the insert 100, and/or the like. For instance, in the embodiment illustrated in FIG. 1, the porous insert 100 has a hemispherical shape.

With continued reference to FIG. 1, the illustrated porous insert 100 comprises an insert body 102 that includes two portions: a first portion 104 with a first permeability, and a second portion 106 with a second permeability. The insert body 102 can take any suitable shape and size for placement within the fluid flow structure 108. The insert body 102 may be shaped to have sealing engagement with an inner wall of the fluid flow structure 108 such that all fluid flowing in the structure 108 passes through the insert 100. In the illustrated embodiment, the insert body 102 is shaped as a three-dimensional hollow dome.

As noted above, the first portion 104 and the second portion 106 can have a shape, size, and/or pattern that is configured to create a desired fluid velocity profile where fluid exits the insert 100. In the illustrated embodiment, the second portion 106 with the second permeability comprises a torus within a corresponding indent in the first portion 104 with the first permeability. In the illustrated embodiment, the first portion 104 and the second portion 106 are arranged such that any fluid passing through the second portion 106 with the second permeability additionally passes through the first portion 104 with the first permeability. In another embodiment, the first portion 104 and the second portion 106 can be arranged such that fluid will pass through either the first portion 104 or the second portion 106, but not both portions.

In the embodiment illustrated in FIG. 1, the first portion 104 and the second portion 106 are arranged to create uniform fluid velocity for fluid exiting the porous insert 100. In the illustrated embodiment, fluid in the fluid flow structure 108 travels along flow paths indicated by the arrows A. In this example, the fluid will travel at substantially similar velocities for the different flow paths. If the insert were not present, due to the cross-section of the fluid flow structure 108 changing, velocities of different flow paths in the smaller cross-section area would be non-uniform. By placing the insert 100 in the fluid flow structure 108, the fluid enters the insert 100 at side 110 with the velocities indicated by arrows A and the arrangement of the permeabilities results in the fluid exiting the insert 100 at side 112 with uniform velocities indicated by the uniform length of arrows B.

The difference in permeability between the first portion 104 and the second portion 106 can be selected to create the desired velocity profile at the exit of the insert 100. For instance, the second permeability may be 50× higher than the first permeability. Further, it is to be noted that, at least for the second portion 106, permeability therein may be constant or may vary. For instance, permeability of the second portion 106 may be graded.

In addition to the insert 100, the fluid flow structure 108 may further include porous material located adjacent the insert 100. The porous material can be located on any side of the insert 100, such as side 110 and/or side 112. In the illustrated embodiment, porous material 114 is located adjacent side 110 of the insert 100 where the fluid enters the insert 100. Any suitable porous material 114 can be used for regulating fluid flow before or after the insert 100, such as silica. The arrangement of the first permeability and the second permeability may be based on the porous material 114, such as porous material selected, location of the porous material, amount of the porous material, and/or the like. Further, the porous material 114 may be incorporated into the insert 100 such that one or more portions of the insert 100 can be formed off the porous material 114.

The insert body 102 can be formed of any suitable material and may depend on the desired permeability(s), the fluid type passing through the porous insert 100, shape and/or size of the porous insert 100, method of manufacturing the porous insert 100, chemical compatibility, and/or the like. For instance, the material can comprise stainless steel; glass; a polymer, such as nylon; silicone; and/or acrylonitrile-butadiene-styrene (ABS).

The porous insert 100 can be formed by any suitable manufacturing technique. For instance, in one embodiment, the porous insert 100 can be formed by additive manufacturing. A first additive manufacturing process can be used to manufacture the first portion with the first permeability while a second different additive manufacturing process can be used to manufacture the second portion with the second permeability. Conventionally, during a major type of additive manufacturing, particles of material are melted together via a laser to form a desired three-dimensional object. In this technique, a laser of an additive manufacturing structure can be modulated to vary permeability. More particularly, an input power and/or speed (scan rate) of the laser can be changed between a first portion of the insert and the second portion of the insert to vary permeability of the first portion and the second portion. Any suitable additive manufacturing process that can be modified to form the porous insert 100 can be used, such as photopolymerization, extrusion (such as extrusion with reacting flow), forward transfer, electron beam, and/or the like.

In another embodiment, layers of porous material can be stacked on another and then connected to form the porous insert 100. For instance, the stacked layers may be bonded together via diffusion bonding or sintering. The pores of each layer can be arranged to result in a particular permeability(s) that remains after the sintering process. In another embodiment, the sintering process can cause one or more pores of one or more of the stacked layers to close over to create a desired permeability(s). The sintering process can cause the material in a stacked layer to melt to cover a portion of the one or more pores.

Figure 2:
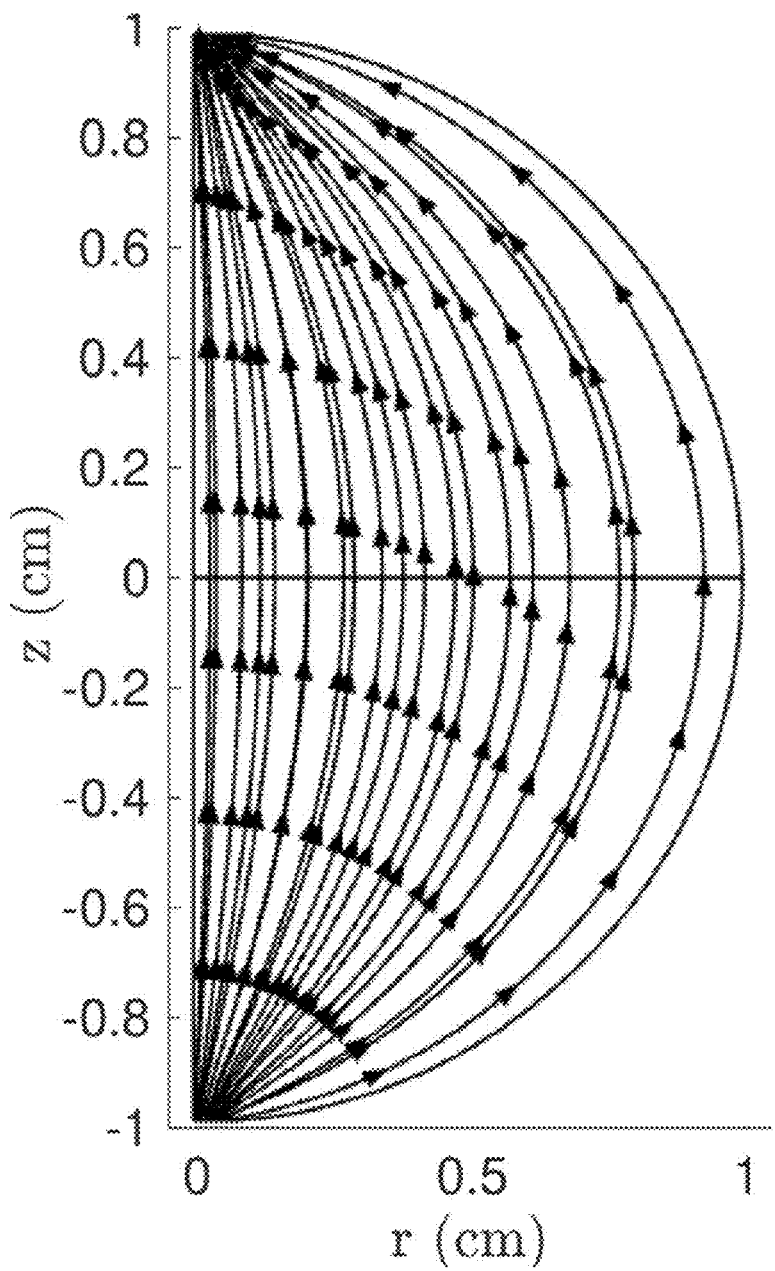
FIG. 2 illustrates a graph showing flow streamlines for a measurement of distance from the center of a diffuser along the mid-plane versus a measurement of distance from a mid-plane of the diffuser.

Any suitable method can be used to determine a pattern for arranging the portions of the porous insert 102. Turning now to FIG. 2, in an embodiment, gas flow in a spherical diffuser is considered to determine a permeability for each flow streamline that results in a uniform mid-plane velocity profile for all of the flow streamlines passing through the diffuser. In this embodiment, it is assumed that the diffuser has cylindrically symmetric geometry about a central axis such that a two-dimensional semi-circular cross-section can depict the radial and axial variations in velocity and permeability, and there is no variation with changing angle about the central axis. In this embodiment, both a linear and a quadratic trend is considered. In the illustrated embodiment, the fixed parameters are a gas inlet and outlet radius ($R_{io}$) and a constant permeability ($K_0$). Gas flowing in the diffuser can follow streamlines illustrated in FIG. 2. In the illustrated chart in FIG. 2, a first axis represents distance (r) in centimeters from the central axis of the diffuser and a second axis represents distance (z) in centimeters from the mid-plane of the diffuser.

The different lengths of the streamlines are due to the curved outer wall of the diffuser. More particularly, the farther a streamline is from the central axis of the diffuser, the slower the fluid travels. The embodiment can use any suitable information from the streamlines, such as travel time for a streamline, whether cumulative for the entire streamline and/or between two particular points, and/or velocity for the streamline, whether an average over the streamline and/or average between two points.

In one version of this embodiment, a parametric optimization approach is taken with a focus on obtaining an almost uniform gas velocity distribution $w_{mid}=w(r, 0)$ at the mid-plane of the diffuser. In the parametric approach, a mathematical expression of the permeability profile $K(r, z)$ has to be assumed. The permeability can vary both linearly and quadratically in both radial and axial directions. Several choices exist to maximize the velocity uniformity. In one example, minimizing a standard deviation $\sigma(w_{mid})$ of its distribution is the objective function during the optimization.

In another version of this embodiment, a non-parametric method is taken using non-parametric inversion. In this approach, a given diffuser geometry is assumed and a permeability profile $K(r, z)$ is iteratively found based on a mid-plane velocity distribution $w_{mid}(r)$ and a spatial transit time $t_s(r, z)$. In a first step, an initial constant permeability estimate $K_0(r)=K_0$ is used which results in a velocity profile where w is large near r=0 and low near $r=R_D$. In contrast to velocity, the transit time is low near r=0 and large near $r=R_D$. A decrease of the velocity near r=0 and increase near $r=R_2$ helps establishing a uniform profile of both $w_{mid}(r)$ and $t_s(r, z)$. This can be accomplished by a decrease of permeability near r=0 and an increase of permeability near $r=R_D$. Accordingly, the optimal $K(r, z)$ can be tightly related to $t_s(r, z)$ and to the inverse of $w_{mid}$. Iterations of the equation 1, below, can then be repeated until a desired convergence is reached.

$$K_{l,i}(r) = K_{l,i-1}(r) \times \frac{\max(w_{out,i-1}(r))}{w_{out,i-1}(r)} \times \frac{ts_{i-1}(r, z)}{\max(ts_{i-1}(r, z))} \quad \text{Equation 1}$$

Figure 3:
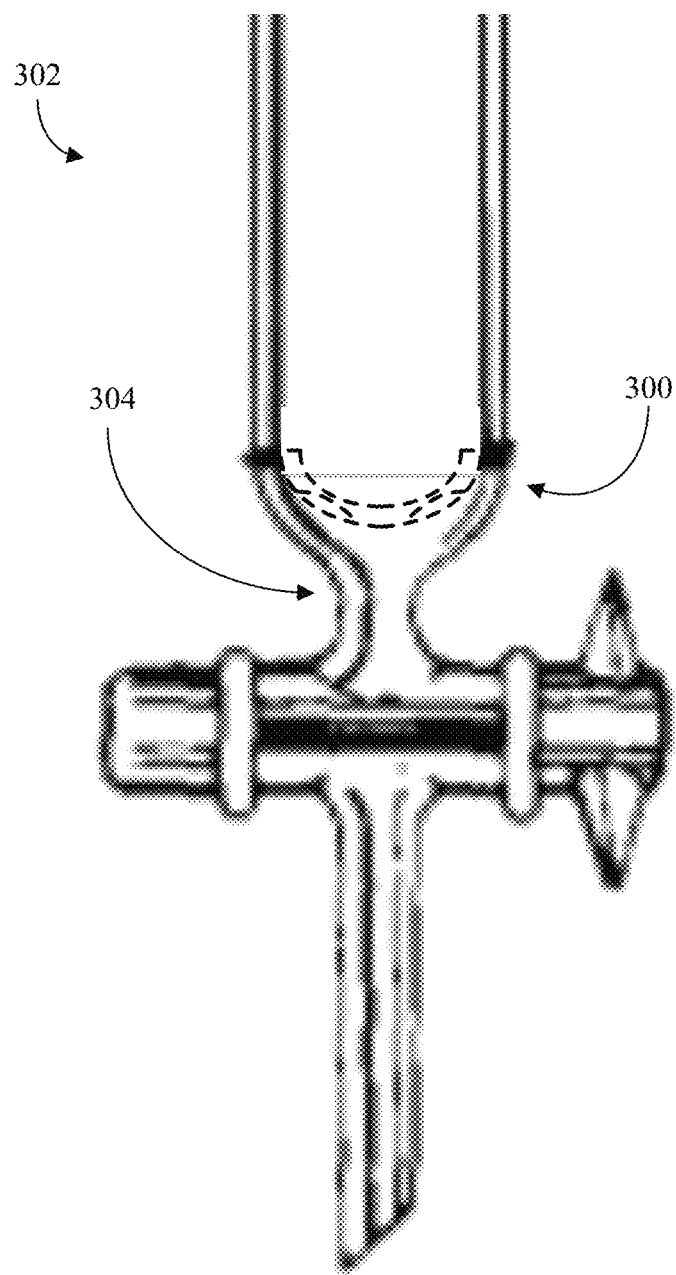
FIG. 3 illustrates an exemplary fluid flow structure with a fluid flow control device with graded permeability located therein.

Turning now to FIG. 3, illustrated is an embodiment of a porous insert 300 placed inside a fluid flow structure. In the illustrated embodiment, the porous insert 300 is placed inside a glass chromatography column 302. As mentioned above, the porous insert 300 can be placed at any suitable location inside the column 302 and in the illustrated embodiment is placed adjacent an outlet 304 of the column 302. The porous insert 300 can be shaped such that a body of the porous insert 300 extends across an entire inner surface area of the chromatograph 302.

As noted above, the porous insert 300 can have an arrangement of permeabilities that result in a desired fluid flow velocity profile across the insert 300 to create desired fluid flow velocities at an exit of the insert 300. Because the arrangement of permeabilities can be calculated based on fluid flow velocities along streamlines within the chromatograph 302, the arrangement can depend on the location of the insert 300 within the chromatograph 302. Accordingly, a desired location of the insert 300 is established before calculating an arrangement of permeabilities within the insert 300. Subsequent to establishing the desired location for the insert 300, a desired velocity for a location(s) within the insert 300 is then calculated based on velocity of fluid flowing along a streamline in the chromatograph 302 that extends though the location in the insert 300 when the insert is placed within the chromatograph 302. The calculated desired velocity is then used to determine a permeability for that location(s) in the insert 300.

Moreover, more than one insert can be placed inside a fluid flow structure. In the embodiment illustrated in FIG. 3, a porous insert 300 is placed adjacent the outlet 304 of the chromatograph 302 where the chromatograph 302 goes from a wide cross-section to a narrow cross-section. In another embodiment, two porous inserts can be placed in a chromatograph, one at a location where the chromatograph goes from a narrow cross-section to a wide cross-section and another at a location where the chromatograph goes from the wide cross-section to the narrow cross-section. By placing porous inserts at each of those locations, the porous inserts can be used to create uniform fluid flow streamline expansion and uniform fluid flow streamline contraction.

Figure 4:
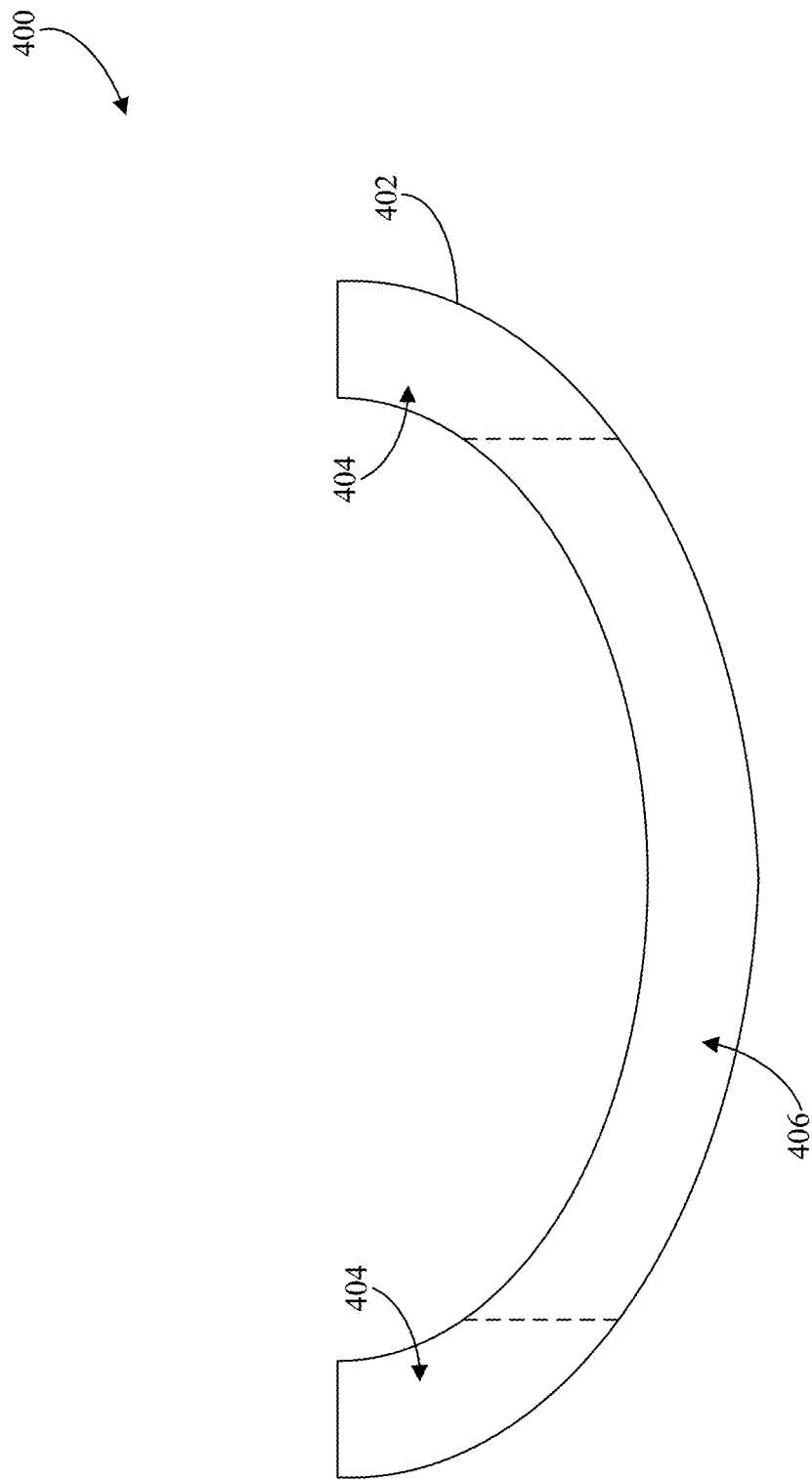
FIG. 4 illustrates another exemplary fluid flow control device with graded permeability.

Turning now to FIG. 4, illustrated is another arrangement of permeabilities within a porous insert 400. In the illustrated embodiment, each permeability(s) extends through a thickness of an insert body 402. More particularly, the insert body 402 includes a first portion 404 with a first permeability that extends through the thickness of the insert body 402 and a second portion 406 with a second permeability that extends through the thickness of the insert body 402. In the illustrated embodiment, the first portion 404 and the second portion 406 are arranged concentrically such that the first portion 404 is located within a central region of the insert body 402 and the second portion 406 is arranged to surround a perimeter of the first portion 404. As mentioned above, the insert body 402 can take any suitable shape and in the illustrated embodiment has a curved profile.

Figure 5:
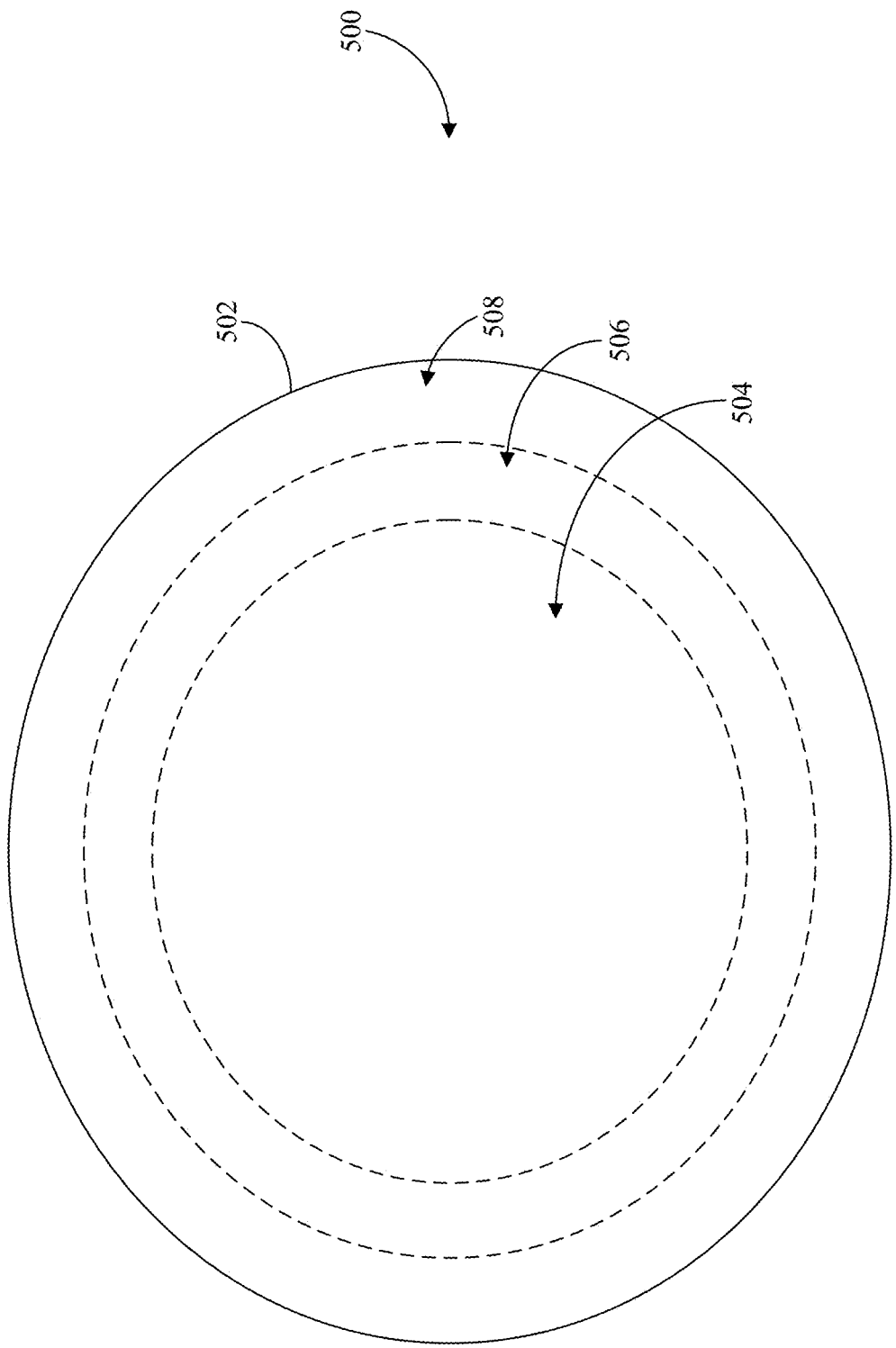
FIG. 5 illustrates a further fluid flow control device with graded permeability.

Turning now to FIG. 5, an overhead view of an insert 500 that includes three different permeabilities is depicted. More particularly, the insert 500 comprises an insert body 502 that includes a first portion 504 with a first permeability, a second portion 506 with a second permeability, and a third portion 508 with a third permeability. As noted above, permeabilities can be arranged to create a specific velocity profile at an exit of the insert 500, and in the illustrated embodiment, similar to the embodiment illustrated in FIG. 4, the portions can be arranged concentrically with the first portion 504 centrally located in the insert body 502, the second portion 506 located around the first portion 504, and the third portion 508 located around the second portion 506 to sandwich the second portion 506 between the first portion 504 and the third portion 508. As noted above, the difference in permeability for each portion of the insert 500 can be calculated based on the desired velocity profile at an exit of the insert 500, for instance the porous insert 500 can be configured to have a higher permeability for each portion from a center of the insert body 502 to an edge of the insert body 502. For example, the third portion 508 can have a higher permeability than the first portion 504 and the second portion 506 while the second portion 506 has a higher permeability than the first portion 504.

Figure 6:
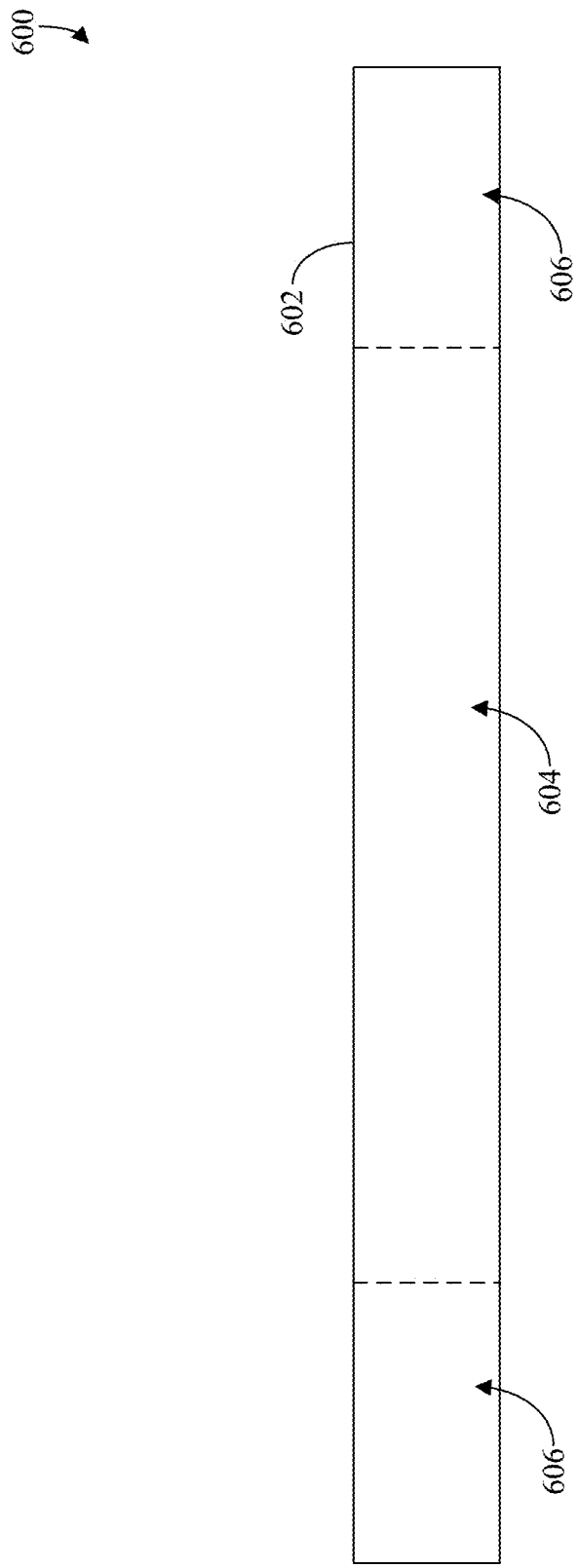
FIG. 6 illustrates yet another fluid flow control device with graded permeability.

As noted above, the insert can be designed to achieve a desired velocity profile at an exit of the insert. Turning now to FIG. 6, illustrated is an embodiment of an insert 600 with an insert body 602 that has a planar profile. A planar profile for the insert 600 may be desired where the insert 600 is placed to control fluid flow velocity as it exits the outlet of a fluid flow structure. In the illustrated embodiment, the insert body 602 includes a first portion 604 with a first permeability and a second portion 606 with a second permeability that are arranged concentrically, similar to the insert 400 in FIG. 4.

Figure 7:
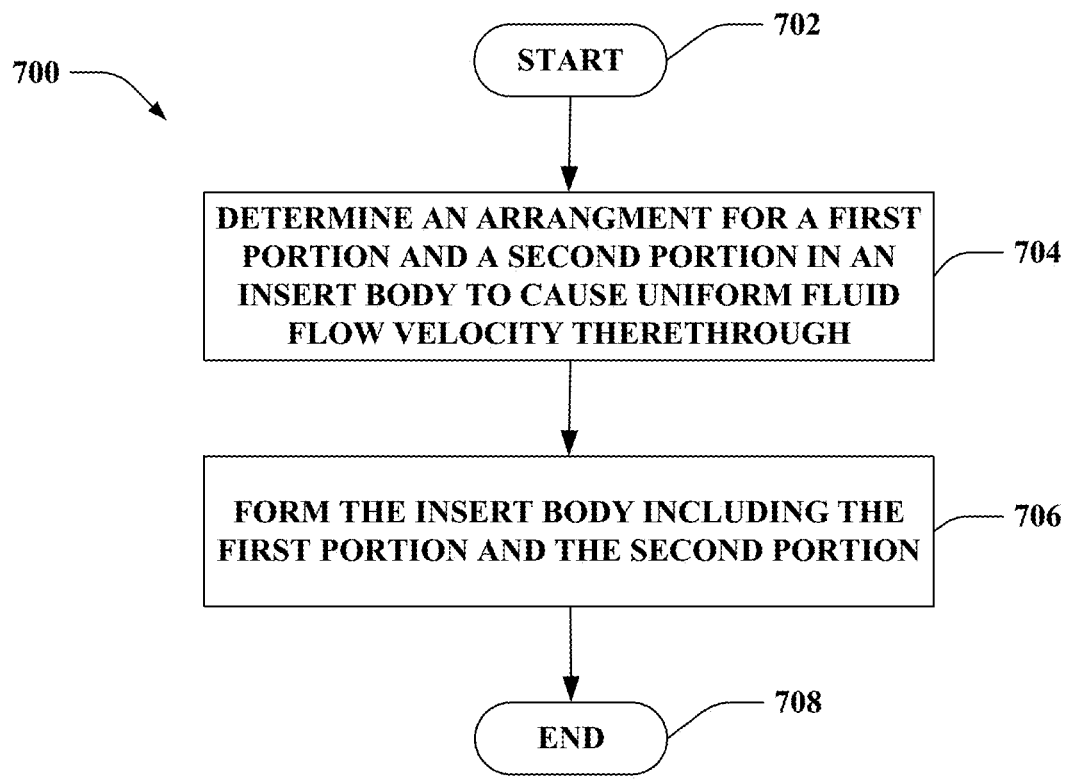
FIG. 7 is a flow diagram that illustrates an exemplary methodology for forming a fluid flow control device with graded permeability.

FIG. 7 illustrates an exemplary methodology relating to forming a porous insert. While the methodology 700 is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

The methodology 700 starts at 702, and at 704, an arrangement for a first portion and a second portion in an insert body is determined, where the arrangement is determined to cause uniform fluid flow velocity therethrough of fluid in a fluid flow structure when the insert body is placed inside the fluid flow structure. The first portion can have a first permeability and the second portion can have different second permeability. At 706, the insert body is formed including the first portion and the second portion. The insert body can be formed for sealing insertion into a fluid flow structure. The methodology 700 concludes at 708.

In one embodiment of the methodology 700, determining the arrangement for the first portion and the second portion can comprise determining a cumulative time required for fluid to flow along a flow streamline in the fluid flow structure.

In one version of the embodiment, determining the arrangement for the first portion and the second portion may further comprise parametric optimization to determine permeability based on the cumulative time. In another version of the embodiment, determining the arrangement for the first portion and the second portion may further comprise using non-parametric inversion to determine permeability based on the cumulative time.

In another embodiment of methodology 700, forming the insert body may comprise forming the insert body via additive manufacturing. The first portion can be formed with a first additive manufacturing process. The second portion can be formed with a second additive manufacturing process, wherein the first additive manufacturing process and the second additive manufacturing process are different.

In a further embodiment of methodology 700, forming the insert body may comprise stacking layers of porous material on one another and bonding the layers of porous material together via sintering. The sintering can cause at least one of a pore to form or material to melt to cover a pore in one of the stacked layers.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fluid flow control device with graded permeability comprising:
an insert body, wherein the insert body is shaped for sealing insertion into a fluid flow structure for fluid flow therethrough, wherein the insert body comprises:
a first portion with a first permeability, wherein the first portion is centrally located within the insert body; and
a second portion with a second permeability, wherein the second portion is located beyond a distance from a center of the insert body such that the second portion is at a farther distance from a central axis of the insert body as compared to the first portion,
wherein the first permeability of the first portion is lower than the second permeability of the second portion,
wherein the first portion and the second portion are arranged in the insert body to cause fluid to pass through the first portion and the second portion when the insert body is placed inside the fluid flow structure;
wherein the insert body has a circular cross-section and the first portion and the second portion are arranged concentrically such that the second portion surrounds a perimeter of the first portion.

2. The fluid flow control device of claim 1, wherein the insert body has a curved profile.

3. The fluid flow control device of claim 1, wherein the insert body has a planar profile.

4. The fluid flow control device of claim 1, wherein arrangement of the first portion and the second portion is based on parametric optimization.

5. The fluid flow control device of claim 1, wherein arrangement of the first portion and the second portion is based on non-parametric inversion.

6. The fluid flow control device of claim 1, wherein the first portion has a first thickness, wherein the second portion has a second thickness different from the first thickness.

7. The fluid flow control device of claim 1, wherein the insert body comprises stainless steel.

8. The fluid flow control device of claim 1, wherein the insert body comprises additive manufactured material.

9. The fluid flow control device of claim 1, wherein the insert body further comprises:
a third portion with a third permeability, wherein the first portion, the second portion, and the third portion are arranged to cause the fluid to through the first portion, the second portion, and the third portion when the insert body is placed inside the fluid flow structure, wherein the third permeability differs from the first permeability, and wherein the third permeability differs from the second permeability.

10. A method of manufacturing a fluid flow control device with graded permeability comprising:
determining an arrangement for a first portion and a second portion in an insert body to cause uniform fluid flow velocity of fluid in a fluid flow structure at an exit of the insert body when the insert body is placed inside the fluid flow structure, wherein the first portion is centrally located within the insert body, wherein the second portion is located beyond a distance from a center of the insert body such that the second portion is at a farther distance from a central axis of the insert body as compared to the first portion, wherein the first portion has a first permeability and the second portion has a second permeability, wherein the first permeability of the first portion is lower than the second permeability of the second portion, and further wherein the fluid passes through both the first portion and the second portion when flowing through the fluid structure; and
forming the insert body including the first portion and the second portion, wherein the insert body is formed for sealing insertion into the fluid flow structure;
wherein the insert body has a circular cross-section and the first portion and the second portion are arranged concentrically such that the second portion surrounds a perimeter of the first portion.

11. The method of claim 10, wherein determining the arrangement for the first portion and the second portion comprises determining a cumulative time required for fluid or component of a fluid mixture to flow along a flow streamline in the fluid flow structure.

12. The method of claim 11, wherein determining the arrangement for the first portion and the second portion further comprises parametric optimization to determine permeability based on the cumulative time.

13. The method of claim 11, wherein determining the arrangement for the first portion and the second portion further comprises using non-parametric inversion to determine permeability based on the cumulative time.

14. The method of claim 10, wherein forming the insert body comprises forming the insert body via additive manufacturing, wherein the first portion is formed with a first input power and a first scan rate, wherein the second portion is formed with a second input power and a second scan rate, wherein the first input power and the second input power are different, wherein the first scan rate and the second scan rate are different.

15. The method of claim 10, wherein forming the insert body comprises:
stacking layers of porous material on one another; and
bonding the layers of porous material together via diffusion bonding, wherein the diffusion bonding causes at least one of a pore to form in a stacked layer or material to melt to cover a pore in one of the stacked layers.

16. A fluid flow control device with graded permeability comprising:
an insert body, wherein the insert body is shaped for sealing insertion into a fluid flow structure for fluid flow therethrough, wherein the insert body comprises:
a first portion with a first permeability; and
a second portion with a second permeability, wherein the second permeability is higher than the first permeability,
wherein the first portion and the second portion are arranged in the insert body to cause the fluid to pass through the first portion and the second portion when the insert body is placed inside the fluid flow structure,
wherein the insert body has a circular cross-section, wherein the first portion and the second portion are arranged concentrically, wherein the first portion is centrally located within the insert body, and wherein the second portion surrounds a perimeter of the first portion such that the second portion is at a farther distance from a central axis of the insert body as compared to the first portion;
wherein the insert body has a circular cross-section and the first portion and the second portion are arranged concentrically such that the second portion surrounds a perimeter of the first portion.

17. The fluid flow control device of claim 16, wherein the fluid flow structure comprises a chromatography column with an inlet and an outlet, wherein the insert body is shaped for placement in the column adjacent the outlet.

18. The fluid flow control device of claim 16, wherein the insert body includes a first surface and an opposing second surface, wherein the first portion extends a first distance between the first surface and the second surface, wherein the second portion extends the remaining distance between the first surface and the second surface.

\* \* \* \* \*